(12) United States Patent
Sharma et al.

(10) Patent No.: US 11,085,877 B2
(45) Date of Patent: Aug. 10, 2021

(54) APPARATUS AND METHODS FOR MEASURING THE REFRACTIVE INDEX OF A FLUID

(71) Applicant: SCHLUMBERGER TECHNOLOGY CORPORATION, Sugar Land, TX (US)

(72) Inventors: Richa Sharma, Cambridge, MA (US); Raji Shankar, Cambridge, MA (US); Terizhandur S. Ramakrishnan, Boxborough, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 771 days.

(21) Appl. No.: 15/699,177

(22) Filed: Sep. 8, 2017

(65) Prior Publication Data
US 2019/0079007 A1    Mar. 14, 2019

(51) Int. Cl.
*G01N 21/552* (2014.01)
*G01N 21/41* (2006.01)
*G01N 21/3577* (2014.01)
*E21B 49/08* (2006.01)
*G01N 21/17* (2006.01)
(Continued)

(52) U.S. Cl.
CPC .......... *G01N 21/552* (2013.01); *G01N 21/41* (2013.01); *E21B 49/081* (2013.01); *E21B 49/10* (2013.01); *G01N 21/3577* (2013.01); *G01N 21/431* (2013.01); *G01N 2021/1751* (2013.01); *G01N 2021/1755* (2013.01)

(58) Field of Classification Search
CPC ............... G01N 2021/1751; G01N 2021/1755
See application file for complete search history.

(56) References Cited

U.S. PATENT DOCUMENTS 1,968,202 A    7/1934   Hansen
5,473,161 A   12/1995   Nix et al.
(Continued)

FOREIGN PATENT DOCUMENTS

EP       1903329 A1    3/2008
JP       06341949      12/1994
(Continued)

OTHER PUBLICATIONS

Smits et al., "In-situ [sic] optical fluid analysis as an aid to wireline formation sampling", SPE Formation Evaluation, 10(2):91-98, 1995.
(Continued)

*Primary Examiner* — David P Porta
*Assistant Examiner* — Carolyn Fin
(74) *Attorney, Agent, or Firm* — Trevor G. Grove

(57) ABSTRACT

Methods and apparatus are provided for determining the refractive index of a downhole fluid. Two unalike crystals are provided having faces in contact with fluid in the fluid flow line of a borehole tool. The crystals are chosen to have different refractive indices and/or different angles of incidence, but to provide total internal reflection for light that is directed through the crystals to the crystal/fluid interface. The measured attenuations for each crystal are used in conjunction with the known refractive indices and angles of incidence of said crystals to determine the refractive index of the fluid.

12 Claims, 5 Drawing Sheets

(51) Int. Cl.
*E21B 49/10* (2006.01)
*G01N 21/43* (2006.01)

(56) References Cited

U.S. PATENT DOCUMENTS

| | | | |
|---|---|---|---|
| 6,218,662 B1 | 4/2001 | Tchakarov et al. | |
| 6,627,873 B2 | 9/2003 | Tchakarov et al. | |
| 6,662,116 B2 | 12/2003 | Brown | |
| 6,969,857 B2 | 11/2005 | Owen | |
| 6,995,360 B2 | 2/2006 | Jones et al. | |
| 7,289,690 B2 * | 10/2007 | Li | B82Y 20/00 385/12 |
| 7,812,312 B2 | 10/2010 | Mantele et al. | |
| 8,099,241 B2 | 1/2012 | Niu et al. | |
| 9,500,583 B2 | 11/2016 | Jiang et al. | |
| 2007/0108378 A1 | 5/2007 | Terabayashi et al. | |
| 2007/0200065 A1 | 8/2007 | Arno | |
| 2008/0078544 A1 | 4/2008 | Christian et al. | |
| 2008/0309922 A1 | 12/2008 | Anders et al. | |
| 2009/0302221 A1 | 12/2009 | Tavernier et al. | |
| 2011/0051125 A1 | 3/2011 | Kim | |
| 2012/0085144 A1 | 4/2012 | Krolak et al. | |
| 2012/0290208 A1 | 11/2012 | Jiang et al. | |
| 2013/0056626 A1 | 3/2013 | Shen et al. | |

FOREIGN PATENT DOCUMENTS

| | | |
|---|---|---|
| JP | 2000035399 A | 2/2000 |
| WO | 0042416 A1 | 7/2000 |
| WO | 0062028 A2 | 10/2000 |

OTHER PUBLICATIONS

Crombie et al., "Innovations in wireline fluid sampling", Schlumberger Oilfiedl Review, 10(3):26-41, 1998.

Morris et al., "Using optical fluid analysis to evaluate downhole fluid sample contamination", SPE 50603, In proc. Of European Petroleum Conference, Society of Petroleum Engineers, 1998, pp. 283-295.

Paulter et al., "The effect of pressure on the index of refraction of paraffin oil and glycerine", Phys. Rev., 41:366-367, 1932.

Dubey et al., "Refractive index of ternary liquid systems of squalane(+ hexane+benzene; +cyclohexane+ benzene and+ hexane+ cyclohexane)", Indian J. of Pure and Applied Phys., 43(3):175-179, 2005.

Khosrokhavar et al., "Visualization and investigation of natural convection flow of CO2 in aqueous and oleic systems", Journal of Petroleum Science and Engineering, 122:230-239, 2014.

Malacara, "Geometrical and Instrumental Optics", Experimental Methods in the Physical Science, Academic Press, 1988. available at: https://books.google.com/books?id=M7VZrgEACAAJ.

Shumate, "An interferometric measurement of index of refraction", Master's thesis, California Institute of Technology, Pasadena, California, 3, 1964, 75 pages.

Tilton and Taylor, "Refractive index measurement", in: Walter G. Berl, editor, Physical Methods in Chemical Analysis, 2nd ed. vol. I, pp. 412-462, Academic Press, New York, 1960.

Bauer and Fajans, "Refractormetry", In: Arnold Weissberger, editor, Physical Methods of Organic Chemistry, 2nd ed. vol. II, pp. 1141-1240, Academic Press, New York, 1949.

Hasell et al., "High-pressure carbon dioxide uptake for porous organic cages: comparison of spectroscopic and manometric measurement techniques", Chemical Communications, 49(82):9410-9412, 2013.

Cash et al., "Novel Online Sensor for Measuring Dissolved CO2 Using Attenuated Total Reflectance (ATR) Technology", 2007 ASBC Annual Meeting, Jun. 16-20, 2007, Fairmont Empress, Victoria, British Columbia, Canada, Tehermal Fisher Scientific, 1 page.

O'Leary et al., "Attenuated Total Reflection Spectroscopy method for measuring dissolved CO2 concentration in Beer", Published Aug. 2006, 9 pages.

"Spectral Calculator—Atmospheric Gas Spectra, Infrared Molecular Absorpotion Spectrum", SpectralCalc.com, GATS, Inc., May 28, 2010, Web. May 25, 2016, 1 page.

Carroll et al., "The Solubility of Carbon Dioxide in Water at Low Pressure", Journal of Physical and Chemical Reference Data, 1991, vol. 20(6): pp. 1201-1209.

Cotton and Wilkinson, "Advanced Inorganic Chemistry, A Comprehensive Text", 4th Edition, John Wiley & Sons: New York, 1980: pp. 366-367.

Duan and Sun, "An Improved Model Calculating CO2 Solubility in Pure Water and Aqueous NaCL Solutions From 273 to 533 K and From 0 to 2000 Bar", Chemical Geology, 2003, vol. 193(3-4): pp. 257-271.

Halloway et al., "Chapter 5: Carbon Dioxide Transport, Injection and Geological Storage", 2006 IPCC Guidelines for National Greenhouse Gas Inventories, Eds.: Eggleston et al., Intergovernmental Panel on Climate Change, 2006: pp. 5.1 to 5.32.

Hansen et al., "Global Warming in the Twenty-First Century: An Alternative Scenario", PNAS, Aug. 2000, vol. 97(18): pp. 9875-9880.

\* cited by examiner

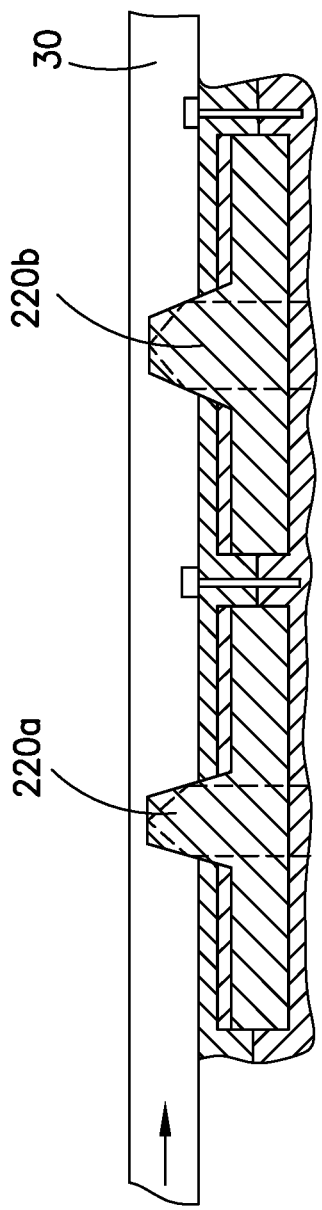
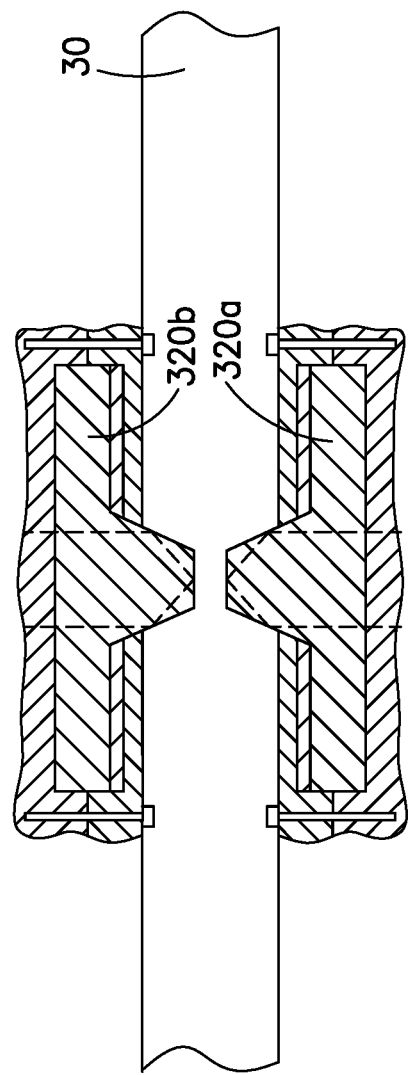

APPARATUS AND METHODS FOR MEASURING THE REFRACTIVE INDEX OF A FLUID

RELATED ART

The present application is related to co-owned U.S. Pat. No. 9,500,583 to Jiang et al., which is hereby incorporated by reference herein in its entirety.

TECHNICAL FIELD

The subject disclosure relates to the downhole monitoring of fluids in a formation. More particularly, the subject disclosure relates to apparatus and methods for measuring the refractive index of a formation fluid which may be useful during production of hydrocarbons from a formation, although the disclosure is not limited thereto.

BACKGROUND

In developing an oilfield, and during both injection and production, reservoir fluids are monitored. In enhanced oil recovery (EOR) processes, compositional measurements within fluids are useful for quantitative evaluation of displacement induced migration. Specifically, data on fluids characterization in different producing zones may be used to infer reservoir structure.

One commonly used approach in measuring fluid composition is to withdraw fluid samples from a reservoir in a formation using a formation testing probe (downhole tool) or packed-off intervals. Light beams and light sensors of the downhole tool are used to measure light transmission at infra-red (IR) wavelengths of the fluid sample which is pulled into a flowline. The spectral characteristics of the transmitted beam are indicative of various components within the fluid, each chemical component having its own absorption signature. In addition, transport properties of the fluid such as the density and viscosity may be obtained.

As disclosed in previously-incorporated U.S. Pat. No. 9,500,583 to Jiang et al., attenuated total reflection (ATR) measurements at mid-IR frequencies can be used to measure a dissolved component, e.g. $CO_2$ in a liquid. Methods utilizing ATR measurements rely on the attenuation of a reflected wave due to a small penetration (usually to a depth of a fraction of a wavelength) of the incident beam's evanescent wave. The penetration depth is dependent on the refractive indices of the fluid and the material with which the fluid is in contact. In the absence of any information, a particular refractive index for the fluid is assumed. However, since the refractive index of the fluid may vary with the concentration of the dissolved components, as well as temperature and pressure, the assumption that the refractive index of fluids flowing through a flowline remains constant can result in certain inaccuracies in analyzing the fluid components, especially in EOR processes.

While the refractive index of formation fluids such as crude oil has been measured uphole using conventional refractometers, it is logistically difficult and expensive to routinely bring reconstituted representative samples to the laboratory for analysis. Moreover, the reservoir fluids being brought uphole may be contaminated by drilling-mud filtrate, and contaminants may be introduced or removed during the fluid transfer process from downhole to the lab, thereby introducing significant bias in the estimates of the refractive index of the downhole fluid. Another challenge arises due to the variability of the refractive index with temperature, fluid composition, and pressure. Yet a further challenge to measuring the refractive index of the formation fluid is posed by the dissolution of gases such as $CO_2$ in the fluid hydrocarbon, the very concentration of which is often the interest in EOR monitoring.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure include a borehole tool employing a flow line, a light source, two non-alike crystals interfacing with the flow line, light detectors, and a processor, where the light source, crystals, and flow line are arranged for light to be transmitted through the crystals and to undergo attenuated total reflection, and the detected intensities (or absorbances) detected by the light detectors are used by the processor in determining the refractive index of the fluid flowing in the flow line. In one embodiment, the non-alike crystals are not alike in that they have different refractive indices, e.g., they are different materials. In one embodiment, the non-alike crystals are of the same material but are not alike in that they have different geometries. In one embodiment, the non-alike crystals differ in both their materials and their geometries.

Additional aspects, embodiments, objects and advantages of the disclosed apparatus and methods may be understood with reference to the following detailed description taken in conjunction with the provided drawings.

BRIEF DESCRIPTION OF THE DRAWINGS

FIGS. 3a and 3b are schematic diagrams showing crystals arranged relative to a flow line.

DETAILED DESCRIPTION

Figure 1:
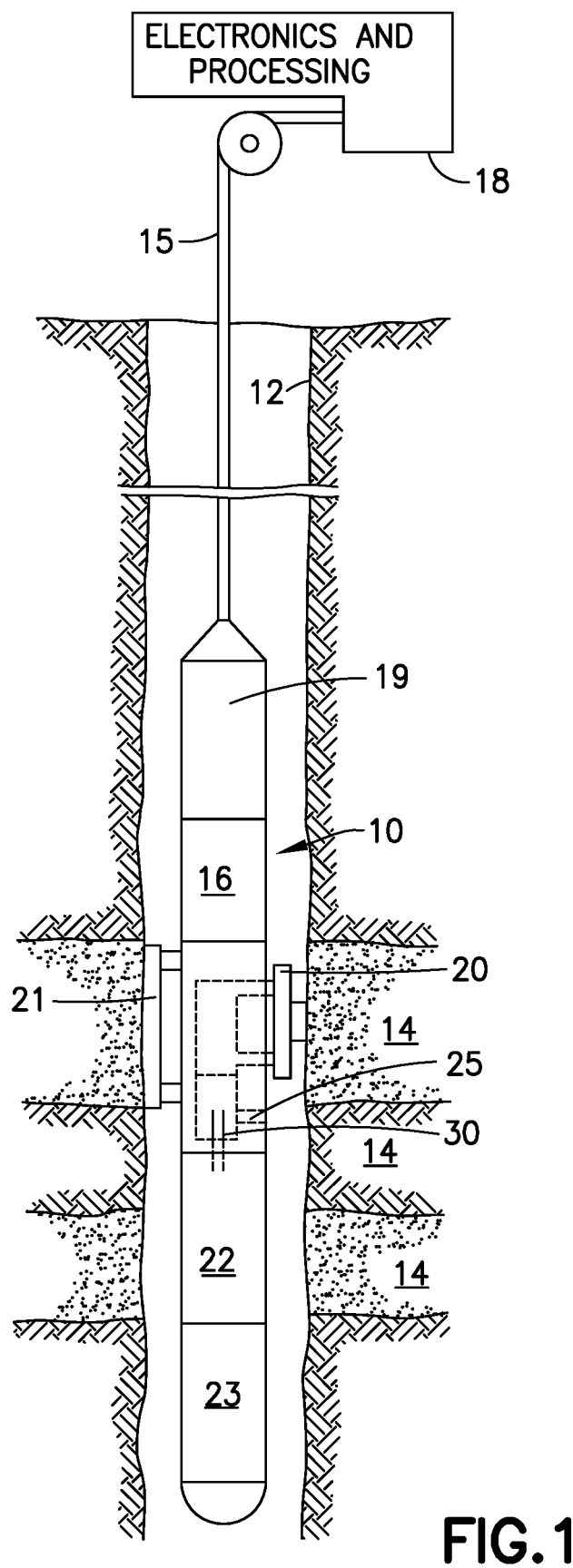
FIG. 1 is a schematic diagram of an apparatus for downhole determination of the refractive index of a formation fluid.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Before discussing embodiments, it is useful to understand some of the underlying physics, and to provide certain definitions.

The refractive index, $\eta$, is the reciprocal of the ratio of the phase velocity $v$ in the medium of interest to the speed of light in a vacuum (c) i.e., $$\eta = \frac{c}{v}. \qquad (1)$$

Light travels slower in a non-vacuum medium than it travels in vacuum because of electromagnetic field interactions with the charged particles of the medium. The speed of light in a particular medium and its refractive index are dependent both on temperature and pressure. Various relationships have been proposed to capture the dependence between refractive index and mass density. For example, in miscible systems, the Gladstone-Dale equation is $$\frac{\eta}{\varrho}\mathbf{1} = \sum_{1}^{N} w_i \eta_{Mi}, \qquad (2)$$

where $\varrho$ is the mass density of the medium, $\eta_{Mi}$ is the molar refractivity of the $i^{th}$ component, $w_i$ is the mass fraction of the component i, and the summation is over all the N components. Another well-known relationship is the Lorentz-Lorenz equation $$\frac{\eta^2}{\eta^2+2}\mathbf{1} = \left(\frac{N_A \alpha}{3M}\right)\varrho, \qquad (3)$$

where $\alpha$ denotes the molecular polarizability of the medium, $N_A$ is the Avogadro's number, and M is the molecular weight of the medium. The polarizability is the coefficient of proportionality between the dipole moment and the electric field.

Measurements of refractive index can be combined with one or more of the aforementioned formulae to obtain physical properties of interest, including mass density, composition of crude oil, viscosity etc. within a restricted series of materials. These estimates are useful for reservoir modeling and in many other contexts.

ATR technology is based on measuring the change in the intensity of a totally internally reflected (infrared) beam when it passes through the interface of the sensor (crystal) and the sample. The change of intensity may be described in terms of the attenuation of the reflected beam intensity when compared to the incident beam.

In implementing technology utilizing attenuated total reflection, two necessary conditions for total internal reflection should be satisfied including that the refractive index of the crystal is greater than that of the sample, and that the incident angle of the beam is greater than the critical angle at the crystal-sample interface. As previously suggested, the amplitude of the internally reflected wave at the crystal-sample interface is affected because the evanescent wave formed while undergoing total internal reflection penetrates the sample adjacent to the interface, and exponentially decays with the distance from the crystal-sample interface. The penetration depth $d_p$ is the distance from the crystal-sample interface where the intensity of the evanescent wave decays to $1/e$ of its original value and is given by $$d_p = \frac{\lambda}{2\Pi\eta_c \sqrt{\sin^2\Theta(\eta_f/\eta_c)^2}}, \qquad (4)$$

where $\lambda$ is the wavelength of infrared radiation, $n_f$ is the refractive index of the fluid, $\eta_c$ is the refractive index of the ATR crystal, and $\Theta$ is the angle of incidence. In a strongly absorbing medium, the interaction between the probing light beam and the medium should be sufficiently small to ensure that measurements are not entirely attenuated. In this context, the extent of interaction is quantified by the depth of penetration. Since the penetration depth of the evanescent wave may be measured in the range of microns to a few millimeters, as set forth in previously incorporated U.S. Pat. No. 9,500,583 to Jiang et al., ATR can be a powerful technique for obtaining indications of $CO_2$ dissolved in brine and crude oil downhole. It is also noted that if the ATR sensing apparatus is configured to have multiple reflections $N_R$, the cumulative depth of penetration $N_R d_p$ may be used to compute the effective optical path length of the sensor, l.

In one aspect, it may be assumed that the effective path length of mid-IR waves in a ATR crystal is proportional to $d_p$ as may be calculated from equation (4). In reality, the interactions are more complicated, as parallel and perpendicular polarized waves undergo differing attenuations, a complexity that is circumvented by the perturbation expansions considered hereinafter. Thus, as a starting point, the effective path length may be calculated according to $$l = K N_R d_p, \qquad (5)$$

where $N_R$ is the number of reflections that is determined by the design of the crystal-fluid interface, and K is an oft-ignored proportionality variable that is likely to vary with $\eta_f$, $\eta_c$ and $\Theta$.

One purpose of making an ATR measurement is for a determination of the concentration C of a dissolved species that attenuates the incident IR-signal at one or more chosen wavelengths. The measurement is conducted by measuring the attenuation ratio, and assuming that $\eta_f$ is known, l is calculated, and from which, the attenuation coefficient at the wavelength of interest is inferred. Since the attenuation coefficient is directly related to C at the sensitive wavelength $\lambda$, the concentration may be estimated. The issue is that the procedure assumes that either $\eta_f$ is known, or that $\eta_f$ is independent of C and that the solvent's $\eta_f$ is known as a function of pressure and temperature. The latter dependence is sufficiently weak and may be accounted for through calibration. Also, traditionally the technique has worked well for dilute solutions. However, when the solution is not dilute in the solute, $\eta_f$ varies with C, resulting in an error in estimated C.

The Beer-Lambert's law relates the absorbance $A(\lambda)$, concentration C of a component in the downhole fluid that induces absorption at $\lambda$, and the optical path length l. At any wavelength $$A(\lambda) = \varepsilon(\lambda) C l = \varepsilon(\lambda) C K N_R d_p, \qquad (6)$$

where $\varepsilon(\lambda)$ is the absorption coefficient of the component at wavelength $\lambda$. Knowing the intensity of the incident beam (e.g., by using a reference wavelength where no attenuation is expected to occur), and the intensity of the reflected beam, $A(\lambda)$ is obtained from $$A(\lambda) = \ln\left(\frac{I(\lambda)}{I_0(\lambda)}\right). \qquad (7)$$

where $I_0(\lambda)$ and $I(\lambda)$ are the magnitudes of the incident intensity and reflected intensity respectively at wavelength $\lambda$. Thus, the measurements allow a determination of $A(\lambda)$. Knowing $A(\lambda)$ provides a determination of C (equation (6)) if $d_p$ is known (for a constant K). This in turn assumes that $\eta_f$ of the fluid is known. However, in the oil-field, the solvent is unknown. Properties of the hydrocarbon vary from well to well or from zone to zone in a given well. In addition, for a given solvent, $\eta_f$ may vary with C.

It will be appreciated by those of skill in the art that the intensity $I_0(\lambda)$ is an unknown unless a reference wavelength at which no attenuation takes place is available. Since the ratio of the intensities of the source beam is known at the two wavelengths (this drift is assumed to be negligible), the reference and the absorption values, $I_0(\lambda)$ is obtained from the reference response. The ratio of the incident intensity may be a function of temperature, but this is known a priori.

With the previously described underlying physics in mind, according to one aspect, the refractive index of a fluid is measured downhole as hereinafter described by using information obtained from two different attenuated total reflectance (ATR) sensors. Knowing the refractive index permits a calculation of the concentration of the species that attenuates the signal at the wavelength of interest. The present description focuses on the mid-infrared (m-IR) range; however, the technique is also extensible to a different range of wavelengths.

Turning now to FIG. 1, an apparatus 10 for determining downhole the refractive index of a formation fluid is seen. The apparatus or tool 10 is seen suspended in a borehole 12 traversing a formation 14 by a cable 15 that is spooled in a usual fashion on a suitable winch (not shown) on the formation surface. On the surface, the cable 15 may be electrically coupled to an electrical control system 18. The tool 10 includes an elongated body 19 which encloses the downhole portion of the tool control system 16. The elongated body 19 also carries a selectively extendable fluid admitting assembly 20 and a selectively extendable tool anchoring member 21 which are respectively arranged on opposite sides of the body. The fluid admitting assembly 20 is equipped for selectively sealing off or isolating selected portions of the wall of the borehole 12 such that pressure or fluid communication with the adjacent earth formation is established. Also included with tool 10 are a fluid analysis module 25 with a flow line 30 through which the obtained fluid flows. The fluid may thereafter be expelled through a port (not shown) or it may be sent to one or more fluid collecting chambers 22 and 23 which may receive and retain the fluids obtained from the formation. Control of the fluid admitting assembly, the fluid analysis section, and the flow path to the collecting chambers is maintained by the electrical control systems 16 and 18.

Figure 2:
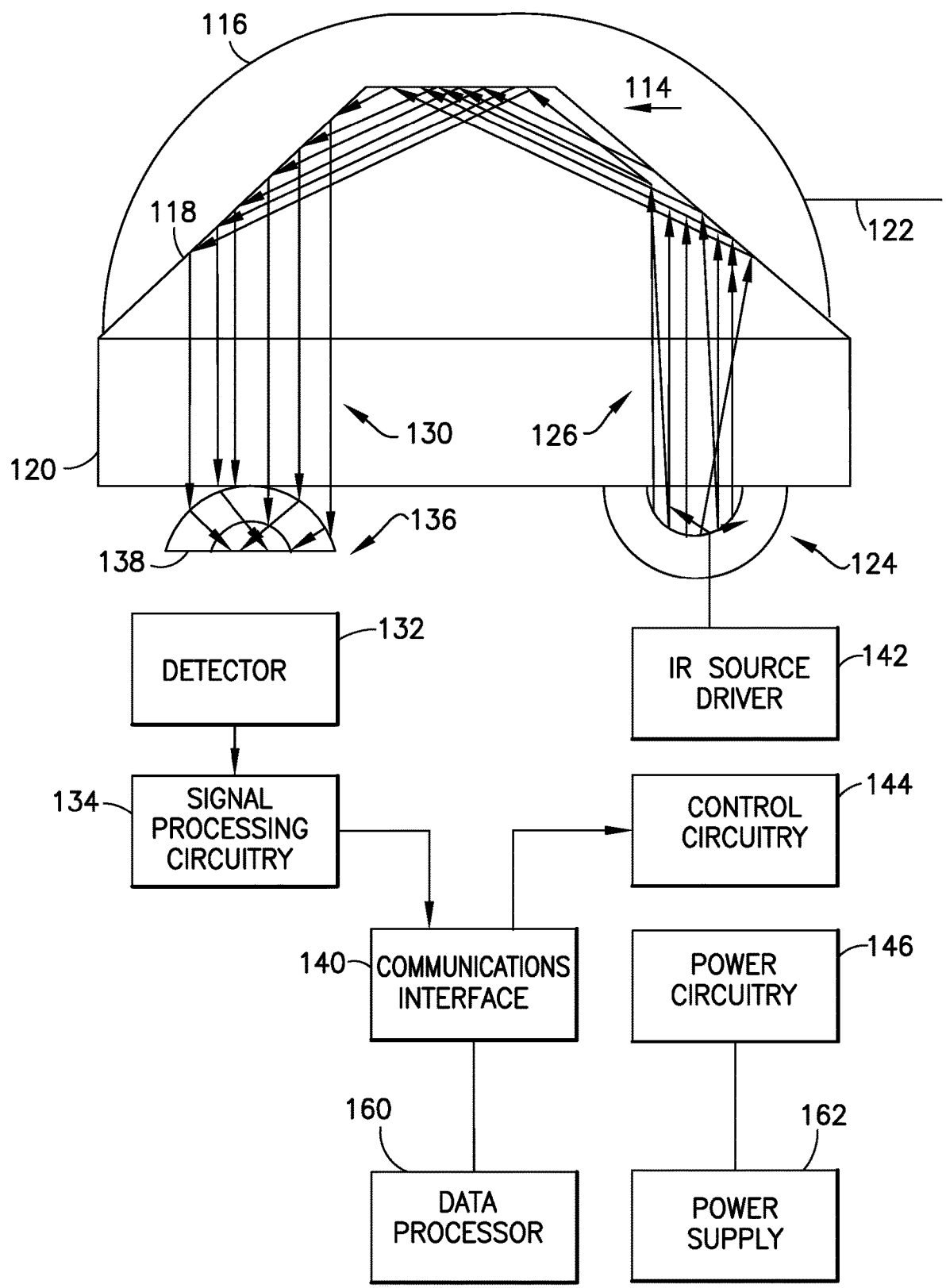
FIG. 2 is a partial block, partial schematic diagram of elements of the apparatus of FIG. 1.

In at least one aspect, at least two testing chambers are placed in communication with the flow line 30 in a manner described hereinafter with respect to FIGS. 3a and 3b. Each test chamber may assume a configuration substantially as shown in FIG. 2. In particular, each sample chamber 114 may be bounded by a cover 116 and an exterior surface 118 of an optically dense crystal 120. The flow line provides for supply of the fluid sample 122 into the sample chamber 114 such that liquid fluid (the sample) is in direct contact with the exterior surface 118 of the crystal 120. An infrared light source 124 generates a beam of infrared radiation 126 that is directed into the crystal 120 such that it is incident on the interface of the crystal 120 and the liquid fluid of the sample 122 at an angle larger than the critical angle $\Theta_c$. The critical angle is a function of the refractive indices of both the sample and the crystal and is given by $\Theta_c = \sin^{-1}(\eta_f/\eta_c)$ where $\eta_c$ is the refractive index of the crystal 120 and $\eta_f$ is the refractive index of the sample 122. The internal reflection of the beam 126 can occur multiple times along the interface of the crystal 120 and the sample 122. The crystal 120 may be realized from a high refractive index material such as sapphire or diamond in order to minimize the critical angle.

In the regions of the infrared spectrum where the sample absorbs energy, the evanescent wave will be attenuated. The crystal 120 directs the reflected beam 130 (including the attenuated energy from each evanescent wave) for supply to an IR detector 132. Signal processing circuitry 134 (e.g. amplifier and filter circuitry, and A/D conversion circuitry) processes the output of the IR detector 132 to measure and process the output of the IR detector 132, thereby measuring the intensity of the detected light within the predetermined IR measurement bands as a function of time and generating digital data corresponding to such measurements. In one embodiment, one or more predetermined IR measurement bands include a predetermined absorption band centered around 4.27 microns (e.g., 4.27 microns ±75 nanometers), a predetermined reference band centered around 4 microns (e.g., 4 microns ±75 nanometers), and a reference band centered around 3 microns (e.g., 3 microns ±75 nanometers).

In one embodiment, the reflected beam (including the attenuated evanescent waves) is guided by a lens 136 through an optical filter 138 to the IR detector 132. The optical filter 138 provides bandpass optical filtering for the predetermined infrared measurement (and reference) bands. The IR detector 132 may include an array of IR detector elements corresponding to the predetermined infrared measurement bands. Alternatively, a single IR detector element can be used.

In one embodiment, additional supporting electronics can be supplied in conjunction with the IR light sources 124 and IR detectors 132. The supporting electronics may be provided for each light source and each detector or may be shared by the light sources and by the detectors. As seen in FIG. 2 such supporting electronics may include a data communication interface 140, IR source driver circuitry 142, control circuity 144, and power circuitry 146. The data communications interface 140 may be electrically coupled to the signal processing circuitry 134 and may operate to communicate the digital data generated by the signal processing circuitry 134 (which represents the intensity of the detected light within the predetermined IR measurement band(s) as a function of time) to an external data processor 160. The data processor 160 processes the digital data as described in more detail below in order to determine the refractive index of the formation fluid sample. The IR source driver circuitry 142 may generate electrical signals for supply to the IR light source 124 in order to operate the IR light source 124 as desired. The control circuitry 144 may control operation of the electrical, optoelectrical and/or optical elements of the apparatus in accordance with commands communicated from the external data processor 160 to the control circuitry 144 via the communications interface 140. For example, the control circuitry 144 may interface to the IR source driver circuitry 142 to activate and control the operational mode of the IR light source 124 via commands issued by the external data processor 160 and communicated thereto via communications interface 140. The control circuitry 144 can carry out other control operations as desired. The power circuitry 146 may receive power supply signals from an external power supply 162 and transform and/or condition these signals into a form suitable for supply to the electrical and opto-electrical elements of the apparatus. The operation of the power circuitry 146 can include AC-DC conversion functions, DC-DC conversion functions, voltage regulation functions, current limiting functions, and other power conditioning functions well known in the arts.

In one aspect, the sensing crystal will be exposed to a high-pressure fluid, whereas the infrared source, detectors, and electronics may be isolated from the fluid. Arrangements for accomplishing the same are described in co-owned U.S. Pat. No. 9,500,583 which was previously incorporated by reference herein.

Turning now to FIG. 3a, one embodiment having two unalike crystals 220a, 220b is seen. The crystals 220a and 220b are seen to be adjacent each other and along a flow line 30. In FIG. 3a, crystals 220a and 220b have different geometries. By way of example only, crystal 220a is a sapphire ATR crystal having faces (exterior surfaces) that angle at 75° from the horizontal, whereas crystal 220b is a sapphire ATR crystal having faces that angle at 65° from the horizontal. When the crystals are in contact with formation fluids, both crystals are expected to have total internal reflection, with three reflections shown. In the arrangement of FIG. 3a, the crystals are arranged such that fluid flowing through the flow line 30 (direction indicated by the arrow) will be first in contact with crystal 220a and then in contact with crystal 220b. Assuming that the fluid is generally homogeneous, measurements can be made simultaneously. On the other hand, if it is assumed that the fluid is not homogeneous, the measurements can be made sequentially when it is expected that the same fluid is adjacent to the respective crystals.

In FIG. 3b, another embodiment having two unalike crystals 320a, 320b is seen. Crystals 320a, 320b are seen to face each other on opposite sides of fluid line 30. As seen in FIG. 3b, crystals 320a and 320b have different geometries. By way of example only, crystal 320a is a sapphire ATR crystal having faces (exterior surfaces) that angle at 75° from the horizontal, whereas crystal 320b is a sapphire ATR crystal having faces that angle at 65° from the horizontal. Because the crystals are arranged opposite each other with the fluid from the fluid line 30 passing therebetween, measurements involving the crystals can be made simultaneously.

In other embodiments, the unalike crystals may have identical geometries (angles of incidence), but may be made from different materials; i.e., the crystals have different refractive indices. By way of example only, one crystal may be a sapphire crystal and the other crystal may be a diamond material.

In yet other embodiments, both the materials and the angles of incidence (geometry) of the unalike crystals may be different. The geometry of each material may be optimized in order to maximize sensitivity to $\eta_f$. Within an expected range of $\eta_f$, the configuration may be tailored so that the difference in the attenuation between the two crystals is maximized for the same wavelength $\lambda$ and number of reflections $N_R$.

With the unalike crystals, equation (4) can be rewritten with an index j which is used to refer to either $$d_{pj} = \frac{\lambda}{2\Pi \eta_{cj} \sqrt{(\sin^2 \Theta_j)(\eta/\eta_{cj})^2}}, \quad (8)$$

where $\eta_{cj}$ denotes the refractive index of crystal j, j=1, 2, . . . and $\Theta_j$ is the angle of incidence designed for each j. With two crystals, using equation (8), a ratio of penetration depths can be expressed as $$\frac{d_{p2}}{d_{p1}} = \frac{\eta_{c1}}{\eta_{c2}} \sqrt{\frac{\sin^2\Theta_1(\eta_f/\eta_{c1})^2}{\sin^2\Theta_2(\eta_f/\eta_{c2})^2}}. \quad (9)$$

Using equations (5) and (6), and replacing $d_p$ yields $$\frac{A_2}{A_1} = \frac{K_2 \eta_{c1}}{K_1 \eta_{c2}} \sqrt{\frac{\sin^2\Theta_1(\eta_f/\eta_{c1})^2}{\sin^2\Theta_1(\eta_f/\eta_{c1})^2}}, \quad (10)$$

(since $N_R$ is expected to be the same for both crystals), where $A_1$ and $A_2$ are attenuations for j=1, 2. As a first approximation, it is assumed that $K_1=K_2$. With that assumption, equation (10) may be used to find the index of refraction for the fluid $\eta_f$, as the indices of refraction of the crystals $\eta_{c1}$ and $\eta_{c2}$ are known, the angles of incidence $\Theta_1$ and $\Theta_2$ are known, and the attenuations $A_1$ and $A_2$ are measured. However, in certain embodiments, and as described in more detail hereinafter, the index of refraction for the fluid may be determined without the $K_1=K_2$ approximation.

For $K_1 \neq K_2$, the ratio of $K_2$ to $K_1$ may be represented as $$\frac{K_2}{K_1} = R(\eta_f; \Theta, \eta_c). \quad (11)$$

In order to construct the dependence of the function R on its arguments, it may be supposed that the true penetration depth is given by the average of the perpendicular and parallel polarized waves' effective path length ($d_e$). Explicit relationships for these are known and the mean value is used for unpolarized light. Therefore $d_e/d_p$ may be computed for various $\eta_f$, $\eta_c$, and $\Theta$ as long as conditions of ATR are met, i.e., a total reflection occurs assuming unpolarized light is used. Otherwise, for polarized light, the components of parallel and perpendicular fields may be considered so as to compute the effective path length appropriately.

Now the ratio of the effective path length and the penetration depth is denoted D, with $D=d_e/d_p$, and a refractive index range restricted between 1.325 to 1.475 is assumed, with the minimum $\eta_m=1.325$ and the maximum $\eta_M=1.475$. This range by no means is restrictive, but is chosen based on commonly encountered values of aqueous fluids and oils. It is easily extended to encompass a larger range. An interesting computational result is that if one denotes as $D_0$ for D at a $\eta_f$ of 1.325, the ratio $D_n=D/D_0$ is nearly independent of $\Theta$ for diamond and sapphire, commonly used in ATR measurements. This is true for 65°≤Θ≤75°. Based on this normalization, $$D_n = \frac{D}{D_0} = f(\eta_f; \eta_c) \quad 65° \leq \Theta \leq 75°, \quad (12)$$

or f is independent of $\Theta$ for the angles of interest.

Figure 4:
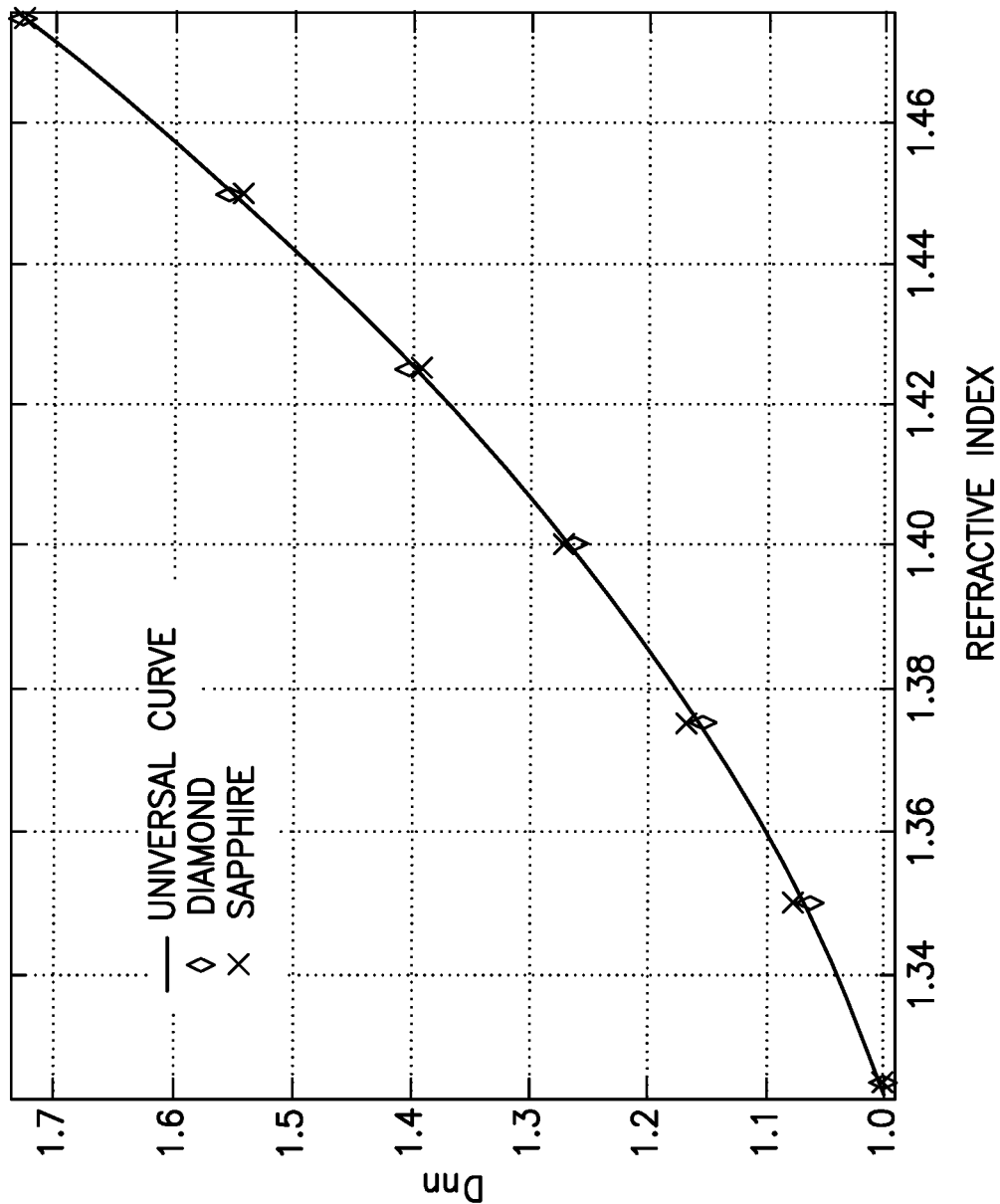
FIG. 4 is a plot of a double normalized function for the effective path length for diamond and sapphire.

In one aspect, the dependence of the ratio on the refractive index of the crystal may also be removed through another normalization. More particularly, a double normalized ratio is defined according to $$D_{nn} = D_n \left[ 1 + \left(\frac{\eta_c}{\eta_s} 1\right)\left(\frac{\eta_f \eta_m}{\eta_M \eta_m}\right)^{3/2} \right] = g(\eta_f). \tag{13}$$

where $\eta_s$ is the refractive index of sapphire and $\eta_c$ is the refractive index of the crystal (diamond or sapphire) through which the measurement is made. Equation (13) is consistent with the earlier statement that for sapphire, $D_n$ is nearly independent of $\Theta$. Equation (13) may be considered important because g is a function of $\eta_f$ alone and shows little dependence on $\eta_c$. FIG. 4 demonstrates this inference.

Thus, given the known function $g(\eta_f)$ through calibration, or less accurately through FIG. 4, $$D = D_n D_0 = D_0 \frac{g(\eta_f)}{\left[1 + \left(\frac{\eta_c}{\eta_s} 1\right)\left(\frac{\eta_f \eta_m}{\eta_M \eta_m}\right)^{3/2}\right]}. \tag{14}$$

Now, $D_0$ is the depth of penetration at $\eta_f=1.325$, a value that is known for a given $\eta_c$ and $\Theta$, or $D_0$ may be written according to $D_0=h(\eta_c,\Theta)$. Thus, D is now known from Equation (14) as a function $\eta_f$.

The measurement of the refractive index of a formation fluid supposes that there are two crystals placed along the tubing or a pipe of a a borehole tool through which a fluid flows. The purpose of the instrumentation is to find the refractive index of the fluid from which other determinations may be made (e.g., inferring a dissolved component concentration), but the component could alter the refractive index determination by its very presence.

As previously suggested, two different ATR crystals (either different $\Theta$, or $\eta_c$ or both) are utilized, and an attenuation measurement is made on the same fluid so that $A_2/A_1$ is measured. On the right hand side of Equation (10) the unknowns are $\eta_f$ and $K_2/K_1$.

In one embodiment, a premise is that $D=d_e/d_p \approx 1/d_p = K$. Thus (see Eq. 9 and 10) the ratio of the D values are the same as that of K. Therefore, $$\frac{A_1}{A_2} = \frac{K_1 d_{p1}}{K_2 d_{p2}} = \tag{15}$$

$$\frac{h(\eta_{c1}, \Theta_1)\left[1 + \left(\frac{\eta_{c2}}{\eta_s} 1\right)\left(\frac{\eta_f \eta_m}{\eta_M \eta_m}\right)^{3/2}\right] \eta_{c2}}{h(\eta_{c2}, \Theta_2)\left[1 + \left(\frac{\eta_{c1}}{\eta_s} 1\right)\left(\frac{\eta_f \eta_m}{\eta_M \eta_m}\right)^{3/2}\right] \eta_{c1}} \sqrt{\frac{\sin^2\Theta_2(\eta_f/\eta_{c2})^2}{\sin^2\Theta_1(\eta_f/\eta_{c1})^2}},$$

where $\eta_s$ is the known refractive index of sapphire, and the right hand side is a function of $\eta_f$ for given geometries of the crystal and its material. Therefore, from the ratio of $A_1$ to $A_2$, $\eta_f$ is obtained by inverting Equation (15), since $\eta_c$ and $\Theta$ are known for the crystals. Note that $g(\eta_f)$ does not appear in the ratio.

Though the inferences are based on the assumption of 1 being approximately the same as $d_e$, this is by no means restrictive. It is possible to take several different solvents whose refractive indices are known and are within the range of interest, dissolve the component whose concentration is desired to a small value, and measure attenuation. This in turn allows knowledge of the path length or K. It is then a matter of constructing a suitable function $h(\eta_c, \Theta)$ and $g(\eta_f)$ from the measured data. The purpose of knowing $g(\eta_f)$ is to confirm that such a function is possible, although it is not used in the ratio evaluation. Note that for the case of K being a constant, $D_n=1$ and $D_{nn}=1$. The depth of penetration from an attenuation point of view is simply proportional to $d_p$. Regardless, the calibration allows a determination of the characteristics of K.

Figure 5:
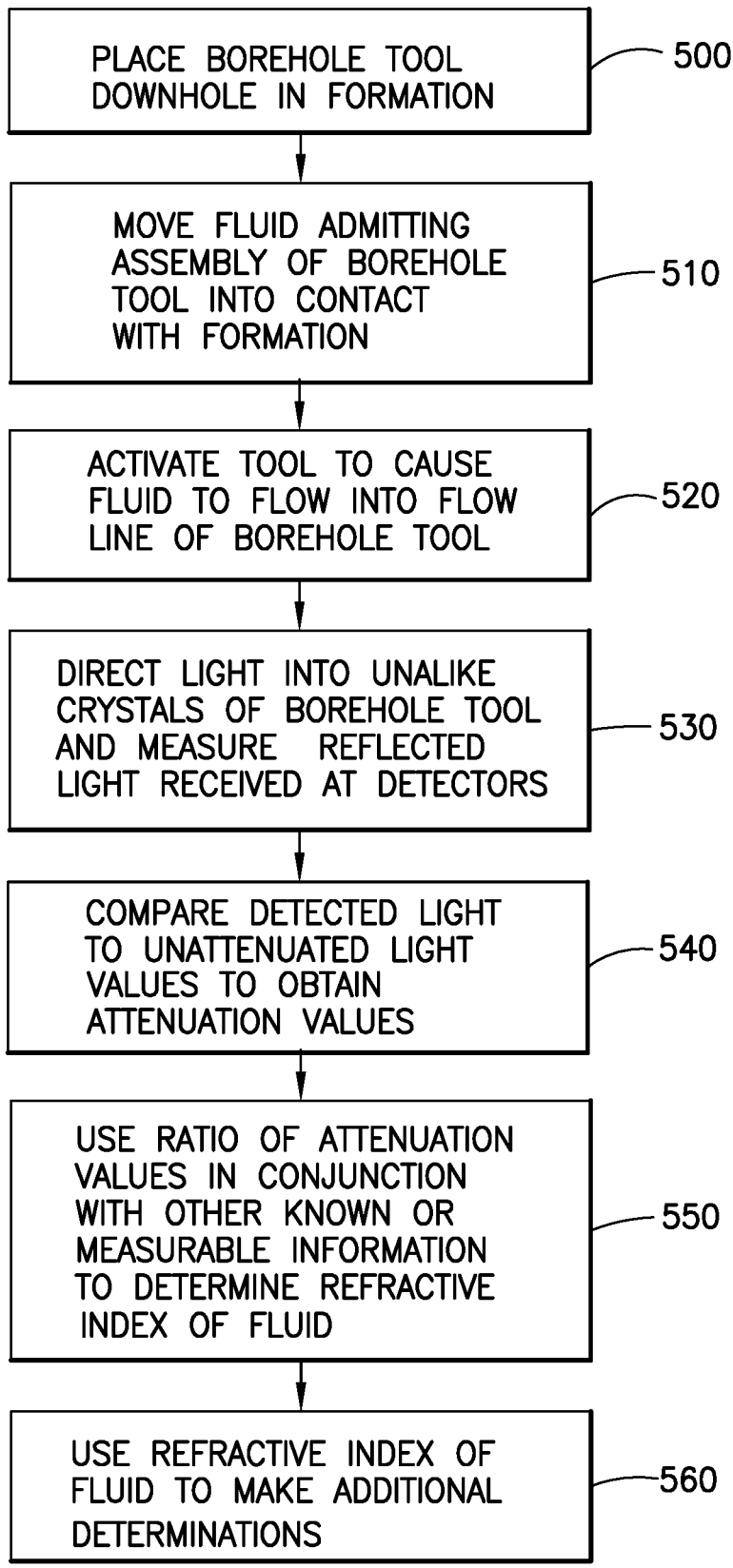
FIG. 5 is a flow chart of a method of determining a refractive index of a formation fluid.

Embodiments of methods utilizing the disclosed apparatus are understood with reference to FIG. 5. More particularly, at 500, a borehole tool having a fluid admitting assembly, a flow line, two unalike crystals in contact with the flow line, at least one light source, and light detectors and associated signal processing circuitry is placed downhole in a formation. At 510, the fluid admitting assembly of the borehole tool is moved into contact with the formation at a location of interest. At 520, the borehole tool is activated to cause formation fluid to flow into the flow line of the borehole tool (e.g., by dropping the pressure in the flow line below the formation pressure). At 530, light (e.g., IR rays) from the light source(s) is directed simultaneously or sequentially into the unalike crystals and detected by the detectors. At 540, the detected light at each detector is compared to an unattenuated light value for the light source associated with that detector in order to obtain attenuation values (e.g., $A_1$ and $A_2$). At 550, a ratio of the attenuation values is used to determine the refractive index of the fluid flowing through the flow line. The refractive index of the fluid may be determined using an equation such as equation (10) or equation (15). In either case, known or measurable values such as the refractive indices of the crystals and the angles of incidence of the crystals are utilized, it being understood and appreciated that the crystals are provided with either different refractive indices and/or with different angles of incidence. In the case of equation (15), additional known values provided including minimum and maximum values for crystal refractive indices. At 560, the determined refractive index of the formation fluid is optionally used in conjunction with other information to provide additional determinations regarding the fluid and/or formation. For example, having obtained a measure of dissolved carbon dioxide for a fluid with a known refractive index, equation (15) may now be modified and utilized to convert a measured attenuation to the attenuation that would have been obtained for the refractive index for which the calibration has been carried out.

More particularly, and according to one aspect, a dissolved component concentration of a gas such as $CO_2$ may be measured as follows. First, a calibration for dissolved $CO_2$ is made with a solvent-solute mixture for which the refractive index is $\eta_{f1}$. Using the methodology already described, the fluid refractive index $\eta_2$ for which the dissolved concentration is desired is obtained. The attenuation $A_2$ is known, but in order to infer the concentration of the dissolved component, the calibration curve known for a fluid refractive index $\eta_{f1}$ is used. Then, the attenuation obtained with $\eta_{f2}$ is shifted to an attenuation that would have been obtained had the fluid been one of refractive index Rewriting Eq. 15 with a crystal of $\eta_{c2}$ and $\Theta_2$, but for fluids of refractive index and $\eta_{f2}$, the following is obtained:

$$\frac{A_1}{A_2} = \frac{g(\eta_{f1})}{g(\eta_{f2})} \frac{\left[1 + \left(\frac{\eta_{c2}}{\eta_s} - 1\right)\left(\frac{\eta_{f2} - \eta_m}{\eta_M - \eta_m}\right)^{3/2}\right]}{\left[1 + \left(\frac{\eta_{c2}}{\eta_s} - 1\right)\left(\frac{\eta_{f1} - \eta_m}{\eta_M - \eta_m}\right)^{3/2}\right]} \sqrt{\frac{\sin^2\theta_2 - (\eta_{f2}/\eta_{c2})^2}{\sin^2\theta_2 - (\eta_{f1}/\eta_{c2})^2}} \tag{16}$$

Knowing $A_1$ from the above equation from a measured $A_2$ thus allows the use of the calibration curve corresponding to a fluid of calibration of $\eta_{f2}$.

In one aspect, some of the methods and processes described above, such as calculating the attenuation values and calculating the refractive index of the formation fluid are performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as FORTRAN, C, C++, Python, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe the use of two unalike crystals, more than two unalike crystals may be utilized. Also, while sapphire and diamond were described for use as crystals, it will be appreciated that other materials could be used. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A borehole apparatus for determining the refractive index of a fluid, comprising:
an elongate body having a fluid admitting assembly and a fluid flow line configured to receive the fluid;
a first crystal and a second crystal each having a face configured to be in contact with the fluid in the fluid flow line, wherein said first and second crystals have different refractive indices, different angles of incidence, or different refractive indices and different angles of incidence with respect to one another;
at least one light source coupled to said first and second crystals and configured to direct light into said first and second crystals, said light having at least one wavelength, and said wavelength, said refractive indices and said angles of incidence being chosen such that said light undergoes total internal reflection at interfaces between said first and second crystals and the fluid;
at least one light detector coupled to said first and second crystals configured to measure the reflected light exiting said crystals; and
a processor coupled to said at least one light detector, said processor configured to determine attenuations of said light entering said crystals and configured to determine said refractive index of the fluid utilizing said attenuations, said refractive indices, and said angles of incidence of said crystals, wherein said refractive index is determined according to:

$$\frac{A_1}{A_2} = \frac{K_1 d_{p1}}{K_2 d_{p2}} = \frac{h(\eta_{c1}, \Theta_1)\left[1+\left(\frac{\eta_{c2}}{\eta_s}-1\right)\left(\frac{\eta_f \eta_m}{\eta_M \eta_m}\right)^{3/2}\right]}{h(\eta_{c2}, \Theta_2)\left[1+\left(\frac{\eta_{c1}}{\eta_s}-1\right)\left(\frac{\eta_f \eta_m}{\eta_M \eta_m}\right)^{3/2}\right]} \frac{\eta_{c2}}{\eta_{c1}} \sqrt{\frac{\sin^2\Theta_2(\eta_f/\eta_{c2})^2}{\sin^2\Theta_1(\eta_f/\eta_{c1})^2}},$$

wherein $A_1$ is the attenuation of said first crystal and $A_2$ is the attenuation of said second crystal, respectively, $\eta_f$ is said refractive index of the fluid, $\eta_{c1}$ is the refractive index of said first crystal, $\eta_{c2}$ is the refractive index of said second crystal, $\Theta_1$ is the angle of incidence of said first crystal, $\Theta_2$ is the angle of incidence of said second crystal, $\eta_M$ is a maximum refractive index value for said first and second crystals and is equal to 1.475 and $\eta_m$ is a minimum refractive index value for said first and second crystals and is equal to 1.325, and $\eta_s$ is a refractive index of a reference crystal material.

2. The borehole apparatus of claim 1, wherein the reference crystal material is sapphire.

3. The borehole apparatus of claim 1, wherein one of said first crystal and said second crystal is a sapphire crystal, and the other of said first crystal and said second crystal is a diamond crystal.

4. The borehole apparatus of claim 1, wherein said first crystal and said second crystal have different angles of incidence, and both said first crystal and said second crystal have an angle of incidence between 65° and 75°.

5. The borehole apparatus of claim 1, wherein said first and second crystals are adjacent each other on one side of said fluid flow line.

6. The borehole apparatus of claim 1, wherein said first and second crystals face each other on opposite sides of said fluid flow line.

7. A method for determining the refractive index of a fluid, comprising:
placing into a borehole traversing a formation a borehole tool having a fluid admitting assembly, a flow line, a first crystal and a second crystal each in contact with the fluid in the flow line, at least one light source, at least one light detector having signal processing circuitry associated therewith, and a processor, wherein said first and second crystals have different refractive indices, different angles of incidence, or different refractive indices and different angles of incidence with respect to one another;

moving the fluid admitting assembly of the borehole tool into contact with the formation at a location of interest in the formation;

causing formation fluid to flow into the flow line of the borehole tool and into contact with said first and second crystals;

directing light from the at least one light source into said first and second crystals, and detecting with the at least one light detector the light exiting the crystals, said crystals and said light source having been chosen such that said light will undergo total internal reflection at interfaces between said crystals and said fluid;

using the signal processing circuitry associated with the at least one light detector to compare the exiting light to an unattenuated light value for the light source associated with the at least one detector in order to obtain attenuation values; and determining with the processor the refractive index of the fluid flowing through the flow line using the attenuation values, the refractive indices, and the angles of incidence of said crystals, wherein the refractive index is determined according to:

$$\frac{A_1}{A_2} = \frac{K_1 d_{p1}}{K_2 d_{p2}} = \frac{h(\eta_{c1}, \Theta_1)\left[1 + \left(\frac{\eta_{c2}}{\eta_s} 1\right)\left(\frac{\eta_f \eta_m}{\eta_M \eta_m}\right)^{3/2}\right] \eta_{c2}}{h(\eta_{c2}, \Theta_2)\left[1 + \left(\frac{\eta_{c1}}{\eta_s} 1\right)\left(\frac{\eta_f \eta_m}{\eta_M \eta_m}\right)^{3/2}\right] \eta_{c1}} \sqrt{\frac{\sin^2\Theta_2(\eta_f/\eta_{c2})^2}{\sin^2\Theta_1(\eta_f/\eta_{c1})^2}},$$

wherein $A_1$ is the attenuation value of said first crystal and $A_2$ is the attenuation value of said second crystal, $\eta_f$ is said refractive index of the fluid, $\eta_{c1}$ is the refractive index of said first crystal, $\eta_{c2}$ is the refractive index of the second crystal, $\Theta_1$ is the angle of incidence of said first crystal, and $\Theta_2$ is the angle of incidence of said second crystal, $\eta_M$ is a maximum refractive index value for said first and second crystals and equal to 1.475 and $\eta_m$ is a minimum refractive index value for said first and second crystals and is equal to 1.325, and $\eta_s$ is a refractive index of a reference crystal material.

8. The method of claim 7, wherein the reference crystal material is sapphire.

9. The method of claim 7, wherein one of said first crystal and said second crystal is a sapphire crystal, and the other of said first crystal and said second crystal is a diamond crystal.

10. The method of claim 7, wherein said first crystal and said second crystal have different angles of incidence, and both said first crystal and said second crystal have an angle of incidence between 65° and 75°.

11. The method of claim 7, wherein said first and second crystals are adjacent each other on one side of said fluid flow line.

12. The method of claim 7, wherein said first and second crystals face each other on opposite sides of said fluid flow line.

* * * * *